(12) United States Patent
Kordass et al.

(10) Patent No.: US 12,514,686 B2
(45) Date of Patent: Jan. 6, 2026

(54) DENTAL SPLINT AND METHOD FOR PRODUCING SAME

(71) Applicant: ZEBRIS MEDICAL GMBH, Isny im Allgäu (DE)

(72) Inventors: Bernd Kordass, Neuenkirchen (DE); Hans Walter Lang, Leutkirch (DE); Dennis Sommer, Dietmannsried (DE); Wolfgang Brunner, Isny (DE)

(73) Assignee: ZEBRIS MEDICAL GMBH, Isny im Allgäu (DE)

( * ) Notice: Subject to any disclaimer, the term of this patent is extended or adjusted under 35 U.S.C. 154(b) by 1049 days.

(21) Appl. No.: 17/438,166

(22) PCT Filed: Mar. 4, 2020

(86) PCT No.: PCT/EP2020/055657
§ 371 (c)(1),
(2) Date: Sep. 10, 2021

(87) PCT Pub. No.: WO2020/182567
PCT Pub. Date: Sep. 17, 2020

(65) Prior Publication Data
US 2022/0142745 A1    May 12, 2022

(30) Foreign Application Priority Data

Mar. 11, 2019 (DE) .......................... 102019106125.3
Jul. 15, 2019 (DE) .......................... 102019119080.0

(51) Int. Cl.
*A61C 7/36* (2006.01)
*A61C 7/00* (2006.01)
(Continued)

(52) U.S. Cl.
CPC ................ *A61C 7/36* (2013.01); *A61C 7/002* (2013.01); *A61C 19/05* (2013.01); *B33Y 10/00* (2014.12); *B33Y 70/00* (2014.12); *B33Y 80/00* (2014.12)

(58) Field of Classification Search
USPC .......................................... 700/98
See application file for complete search history.

(56) References Cited

U.S. PATENT DOCUMENTS 5,975,893 A    11/1999  Chishti et al.
6,671,539 B2 *  12/2003  Gateno .................... A61C 7/08
                                                        433/214
(Continued)

FOREIGN PATENT DOCUMENTS

CN    1655733 A    8/2005  .............. A61C 7/08
CN  101528153 A    9/2009  .............. A61C 8/00
(Continued)

OTHER PUBLICATIONS

Office Action (in Chinese) and an English translation thereof, dated Jul. 27, 2023, issued by the China National Intellectual Property Administration for Applicant's related Chinese Patent Application No. CN202080030064.X.
(Continued)

*Primary Examiner* — Hien D Khuu
(74) *Attorney, Agent, or Firm* — Bodner & Bodner, PLLC; Christian P. Bodner; Gerald T. Bodner

(57) ABSTRACT

The invention relates to a method for producing a dental splint, in particular for the treatment of craniomandibular dysfunction or for the correction of tooth misalignment, comprising a flat body made of plastics, composite and/or elastomer and having a lower face that is provided with a shape configuration according to at least portions of the dental surface profile of a patient's lower jaw, and further having an upper face that is provided with a shape configu-
(Continued)

Figure 1A:
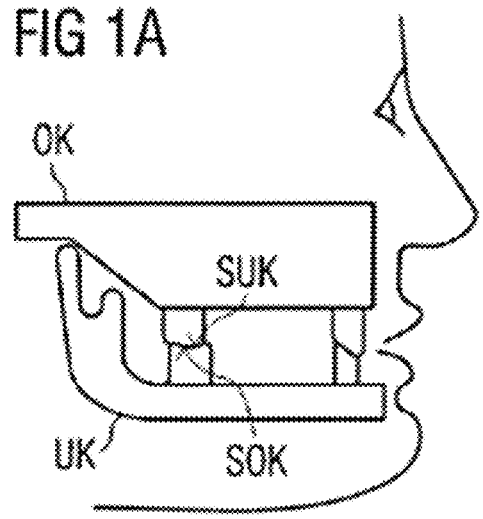

ration according to at least portions of the dental surface profile of the patient's upper jaw, the shape configuration being laterally and/or frontally-dorsally and/or vertically offset by a defined amount on the upper face relative to a position relation of optimum occlusion with respect to the shape configuration on the lower face.

16 Claims, 5 Drawing Sheets

(51) Int. Cl.
  *A61C 19/05* (2006.01)
  *B33Y 10/00* (2015.01)
  *B33Y 70/00* (2020.01)
  *B33Y 80/00* (2015.01)

(56) References Cited

U.S. PATENT DOCUMENTS

| | | | | |
|---|---|---|---|---|
| 8,352,060 | B2* | 1/2013 | Chun | A61C 13/0004 700/98 |
| 11,045,282 | B2 | 6/2021 | Kopelman et al. | |
| 2003/0224312 | A1* | 12/2003 | Bergersen | A61C 7/08 433/6 |
| 2009/0274990 | A1 | 11/2009 | Kim | 433/75 |
| 2010/0281370 | A1 | 11/2010 | Rohaly et al. | 715/719 |
| 2013/0085591 | A1* | 4/2013 | Ertl | A61C 13/0004 700/98 |
| 2016/0157967 | A1* | 6/2016 | Kim | A61C 8/005 433/201.1 |
| 2016/0193019 | A1* | 7/2016 | Heinz | A61C 13/12 433/37 |
| 2018/0000564 | A1* | 1/2018 | Cam | A61C 7/08 |
| 2018/0333226 | A1* | 11/2018 | Tsai | B29C 51/46 |
| 2019/0290408 | A1* | 9/2019 | Fisker | A61C 11/00 |
| 2020/0268495 | A1* | 8/2020 | Ryakhovsky | A61C 13/34 |

FOREIGN PATENT DOCUMENTS

| | | | |
|---|---|---|---|
| CN | 107847298 A | 3/2018 | ............... A61C 7/08 |
| DE | 102014111643 A1 | 2/2016 | ............. A61C 11/00 |
| DE | 102014102111 B4 | 8/2018 | ............. A61B 50/00 |
| EP | 0542848 B1 * | 1/1995 | |
| EP | 2072018 A1 | 6/2009 | ............... A61C 8/00 |
| JP | H09238958 A | 9/1997 | ............. A61C 13/00 |
| WO | WO03099155 A1 | 12/2003 | ............... A61C 7/08 |
| WO | WO_2011014965 A1 * | 2/2011 | |
| WO | WO2014017646 A1 | 1/2014 | ............... A61C 7/08 |
| WO | WO_2019238744 A2 * | 12/2019 | |

OTHER PUBLICATIONS

Notification Concerning Transmittal of International Preliminary Report on Patentability (Chapter I of the Patent Cooperation Treaty), in English, dated Sep. 23, 2021, which was issued by the International Bureau of WIPO in Applicant's corresponding international PCT application having Serial No. PCT/EP2020/055657, filed on Mar. 4, 2020.

English translation of the International Preliminary Report on Patentability (Chapter I of the Patent Cooperation Treaty), dated Aug. 25, 2021, which was issued by the International Bureau of WIPO in Applicant's corresponding international PCT application having Serial No. PCT/EP2020/055657, filed on Mar. 4, 2020.

Written Opinion of the International Searching Authority, in English, dated Jun. 16, 2020, which was issued by the International Bureau of WIPO in Applicant's corresponding international PCT application having Serial No. PCT/EP2020/055657, filed on Mar. 4, 2020.

International Search Report, in English, dated Jun. 16, 2020, which was issued by the International Bureau of WIPO in Applicant's corresponding international PCT application having Serial No. PCT/EP2020/055657, filed on Mar. 4, 2020.

* cited by examiner

DENTAL SPLINT AND METHOD FOR PRODUCING SAME

The invention relates to a method for producing a dental splint, in particular for the treatment of craniomandibular dysfunction or for the correction of tooth misalignment, comprising a flat body made of plastics, composite and/or elastomer and having a lower face that is provided with a shape configuration according to at least portions of the dental surface profile of a patient's lower jaw. It furthermore relates to a dental splint produced by such a method, as well as to a set of dental splints having different dental surface profiles.

Many people suffer from functional disorders of the mandibular joint which can have far-reaching consequences and can impose considerable restrictions on the quality of life such as restricted jaw opening, cracking or rubbing of the mandibular joint when the mouth is opened or closed, headaches, tinnitus, dizziness, swallowing problems, earaches and pains radiating into the entire head, the neck, the shoulder and the back. As a therapy for such functional disorders (craniomandibular dysfunction, CMD), the therapy using so-called occlusal splints has proven to be successful. In case of the described problems, it results in relief and brings the teeth and the mandibular joint to a large extent back into their correct positions.

Dental splints are furthermore used for correcting orthodontic misalignments of teeth. In this case, pressure is exerted upon the desired tooth areas by means of such splints and correspondingly elastic splint material. This results in a degradation of the bone material of the periodontal apparatus and enables the teeth to be displaced in a targeted manner. So that a continuous pressure upon the teeth and therewith an offset up to the desired tooth position is maintained, the side facing the teeth to be displaced is constantly readjusted, and the splints are exchanged.

Dental splints are therefore known for a long time, and different methods for producing them have established. For the manufacture, usually an alginate impression of the set of teeth is first taken. This impression is fully poured with super-hard plaster. By means of a vacuum thermoforming unit, a hot polymer foil is drawn upon the model. Recently, the production in a coordinate-controlled milling method has also been established, the starting point of which are data sets of the dental surface profile of upper jaw and lower jaw obtained by means of a 3D scanner on the plaster model mentioned above. Most recently, 3D printing methods, also referred to as additive manufacturing, are also used for producing occlusal splints. Also in this case, data sets are taken as a basis which had been obtained by digitalizing surfaces of dental imprint models.

In a conventional method the patient closes the lower jaw starting from a relatively large mouth opening. Between the rows of teeth, a plastic mass is formed by the teeth in such a manner that a so-called centric registration is developed. This method has the disadvantage that patients having CMD or joint pains often cannot perform an appropriate closing movement. Therefore, the centric registration frequently becomes useless.

If the function of the dental splint is intended to go beyond a pure protective function against an excessive abrasion of the dental surfaces (such as in a so-called "grinder splint"), the dentist usually intervenes in the design process with certain specifications as to the function of the splint. In a production based on data sets, this is affected by specifying certain allocations between the data sets of dental surface profiles of lower and upper jaw. As an alternative hereto or in addition, the function of the splint can be simulated on an articulator into which the model is placed and subjected to certain motion sequences.

In therapeutical practice, not seldom certain problems arise in the use of dental splints, in particular in the long-term use of the splints. The task is therefore to propose methods for producing dental splints—and correspondingly produced dental splints—which can be used advantageously for eliminating such problems. Apart from that, there is a demand to be able to produce functionally high-quality splints in a more cost-effective manner and to reduce the dentist's and/or dental technician's expenditure of time in the design process for this purpose. Finally, the above-mentioned limitations of conventionally produced dental splints should be overcome as far as possible.

If dental splints are used for displacing teeth, it is important for a jaw relation or condyle position which is advantageous for the patient to remain maintained or be generated in the course of the orthodontic treatment and also in the continuous exchange of the splints.

In fact, orthodontic problems by an incorrect tooth position frequently are accompanied by problems of craniomandibular dysfunction.

The above-mentioned tasks are solved in their method aspect by methods having the features of claim 1, 2 or 5, and in their product aspect by a dental splint according to claim 11, and more specifically by a set of dental splints according to claim 17. Advantageous characteristics of the inventive idea can be found in the respective subclaims.

The invention includes the idea to do without a time-expensive and cost-expensive intermediate step for obtaining a print of the dental surface profile and a corresponding hard plaster model in the production of a dental splint. For this purpose, it is provided according to a first aspect of the invention to directly scan the dental surfaces intraorally by means of a corresponding intraoral scanner. Such intraoral scanners are known per se, and their use is inter alia described in the Applicant's protective right publications, such as in DE 10 2014 111 643 A1.

Assuming a corresponding technical maturity and accuracy, the direct mapping of the dental surfaces for obtaining data sets of the dental surface profile allows the inaccuracy and error susceptibility to be avoided, which, as a matter of principle, comes along with the impression of dental surfaces by means of a registration and the further transferal step into a hard model. Above all, however, the workload is reduced at least in the dental field, if necessary, also in the dentist's field, and the hereby caused cost burden on producing the dental splint is reduced.

Basically, indirectly scanning the dental surfaces on a dental print comes also into question within the framework of the invention—albeit while giving up the above-mentioned advantages of intraoral scanning.

According to a further idea of the invention, it is provided for different possible positional relations or motion sequences between the lower jaw and the upper jaw to be registered "in an automated way" while using a position determination system and to interlink the data sets obtained in position determining with the data sets of dental surface profiles obtained in the intraoral way. Also, the determination of the positional relation between the lower jaw and the upper jaw in fixed tooth positions or during motion sequences is known as such; cf. the Applicant's DE 10 2014 102 111 B4 in this respect.

In the context of the present invention, this method enables jaw relations to be detected in a particularly advantageous manner from a physiological opening movement. In this case, the patient may simply drop the lower jaw due to gravity when the closing muscle system is relaxed, without loaded or painful muscles of a closing motion being active. In addition, the binding of the relevant data sets to a single condyle position given in the known methods, which all the more is possibly therapeutically suboptimal, is omitted.

The step or sequence of the position determination/motion determination can comprise the simultaneous continuous intraoral scanning of the upper jaw and lower jaw teeth, wherein the teeth slide upon each other or on an introduced support pin or spacer. The scanning of the dental surfaces, however, may also be performed separately. The measurement system utilized for the position detection/motion detection works in a manner known per se with cameras or reflecting or active marker elements or with ultrasonic sensors according to the principle of travel-time measurement, or with magnetic sensors or inertial sensors or comprises a combination of the different sensor types mentioned here.

The direct "automated" position detection of the patient's jaws during relevant motion sequences is markedly superior in various respects to the known simulation on an articulator. It is performed in particular with respect to the specific anatomy of the actual patient and not on an unspecific device. Furthermore, data sets can be obtained directly, which can be utilized in the production method (with predefined modifications) as control data sets. Furthermore, the direct collection of the coordinate data sets can be interlinked with the feedback by the patient; see details below.

The therapeutic approach enters also into the present invention to provide a patient suffering from CMD not only with a single occlusal splint, the shape of which corresponds to the state of optimal occlusion, but at least one occlusal splint—preferably an entire set of occlusal splints—the molding of which has a defined spatial (thus lateral and/or frontal/dorsal and/or vertical) offset amount as compared to the positional relation of optimum occlusion. For this purpose, the procedure will be as follows:

a) In the position of optimum occlusion, an occlusion positional relation between the lower jaw and the upper jaw and thus an occlusion relation between the data sets of the associated intraoral scan is determined by means of a position determination system.

b) In a position that is different from the above occlusion, a therapeutic jaw relation between the lower jaw and the upper jaw and thus a therapeutic occlusion relation between the data sets of the associated intraoral scan is determined by means of the position determination system.

c) From the data sets of the occlusion relation that is jaw-therapeutically not effective and the therapeutic occlusion relation, the predetermined lateral and/or dorsal and/or vertical offset amount is determined.

It is understood that each dental splint prevents a "conventional" occlusion of the dental surfaces such as it is achieved without a splint, so that here an "occlusion position relation" or "occlusion relation" is understood to be one as it is achieved by an inserted dental splint when a jaw-therapeutical action is not intended to be achieved. But wherever below and in the claims a "non-occlusion relation" is mentioned, this means, formulated in a shortened manner, a relative position between the lower jaw and the upper jaw which has a jaw-therapeutic function or action as compared to a position of pure "matching" of the dental surfaces of the lower jaw and the upper jaw.

The mentioned effect is achieved by means of the deliberately introduced lateral and/or dorsal and/or vertical offset amounts enforcing a correspondingly displaced relative position of the lower jaw with respect to the upper jaw when the respective dental splint is worn. It is pointed out that with a combination of lateral and dorsal offsets of the moldings, determined (small) rotations/twists of the lower jaw with respect to the upper jaw can also be caused as compared to the state of "ideal" occlusion.

Based on the control data obtained in this way, in a first characteristic of the method according to the invention, the shape configurations on the lower face or the upper face of the dental splint are finally carved out by means of a coordinate-controlled abrasive processing method (in particular milling) from an appropriate basic body (such as from PMMA) while considering the predetermined lateral and/or dorsal and/or vertical offset amount.

In a hereto alternative characteristic, the corresponding data sets are used to build up the dental splint by means of an additive production method on the basis of the scan of at least portions of the dental surfaces of the lower jaw and the upper jaw. In this realization, in particular the dental splint is formed by means of a 3D plastic printing method having the complete data sets of the scan of the dental surfaces of the lower jaw and the upper jaw. It is understood that according to the invention here as well, the predetermined offset amount is taken into account as compared to the position relation of optimum occlusion.

In a still further characteristic of the production concept according to the invention, a thermoplastic film is understood as a basic body (sheet body) for the dental splint, and this film is impressed on the lower face and upper face, respectively, with the shape configurations mentioned above, or an adapting element is adhered or vulcanized to the film or placed and connected to it in another method, which had been produced by a method according to one of the above-mentioned characteristics of the invention.

This production method can be used in a particularly advantageous manner when dental splints for the orthodontic offset of teeth are produced. Due to the use of defined elastic films, a defined and well calculable pressure upon the corresponding teeth can be induced.

Furthermore, it is preferably provided for determining the existing occlusion relation and/or the therapeutic jaw relation (occlusion relation) to register a motion sequence of predetermined jaw movements and to interlink the intraorally taken scans of the dental surfaces with the position data for deriving respective envelopes of the dental surface positions of the lower jaw and the upper jaw. A measurement system that is suitable for this purpose is commercially available and is offered by the Applicant under the product name "JMAnalyser+", for example. A more detailed description of collecting and processing data therefore may be refrained from here.

In a further preferred realization of the invention, an evaluation step is integrated into the determination of the mentioned offset amount for avoiding dental splints to be produced that are found to be inconvenient for the patient and are not utilized at all ultimately. In fact, several predetermined jaw movements (jaw positions) are realized and the patient's feedback is registered, and the patient's feedbacks are subjected to an evaluation according to a predetermined evaluation algorithm for determining the offset amount as compared to the position relation of optimum occlusion. This can be performed basically based solely upon medical evaluation, but information ("it hurts"/"it does not hurt") given by the patient in individual movements may also be included.

In a further realization, preferably the rotation center in the middle of the left or right condyle with respect to a cranium-relative reference plane is determined using the position determination system either by a stylus or by determining the position of the outer ear canal or by a rotation movement of the lower jaw. Thereafter, the respective condyle position or relative position can be detected with the individual lower jaw movements and positions.

In many cases, it is desired for condyle joint heads not being positioned entirely in the rear area of the joint recess but that a defined joint gap remains maintained. Due to the method according to the invention, the relative positions of the condyles can be determined during the determination of the offset amount of the dental surface positions. The position for preparing the dental splint is correspondingly only used when the condyle joint heads have moved within the jaw joint by a defined offset amount and are located in an optimum position.

In the same manner, a pain position may be determined via the patient's feedback, wherein the matter in preparing the dental splint is to avoid this pain position of the condyles.

In a particular embodiment, an acoustic, visual or haptic feedback signal is output to the patient and caregiver by the position calculation unit when the data reveals that an optimum condyle position is reached. Alternatively, a signal can be output as long as the optimum position has not yet been reached or the condyles are in a pain-relevant position. In this case, the pitch or clock frequency of a sound signal can change when the data reveals that the condyles come into the proximity of the desired position, or a light signal can change in its intensity or color, or the patient can track the positions on a screen or achieve a congruence with the desired value in the kind of a target. It is likewise conceivable to give a response to the patient via a vibration signal.

In designing the dental splint, apart from the correct condyle position, also the correct wall thickness of the dental splint, in particular on the tooth upper face is important. Because of that, an acoustic, visual or haptic feedback signal is emitted by the position calculation unit in a further embodiment, when the data reveals that the dental splint wall has a desired optimum thickness.

The feedback information on the optimum condyle position and the optimum thickness of the dental splint wall may either be performed separately or in a combined feedback signal.

The dental splint produced according to the invention may be realized, on the one hand, as lower jaw splint for fixing upon the patient's lower jaw, and, on the other hand, also as an upper joint splint for fixing upon the patient's upper jaw.

If the splint is produced by a coordinate-controlled abrasive processing method, it is typically substantially formed of a rigid plastic (e.g. PMMA) or a composite/hybride ceramics (consisting of inorganic fillers in a plastic matrix) having milled shape configurations on the lower face and the upper face. If the dental splint, however, is produced by a 3D printing method, its is typically mostly made of a fused thermoplastic powder or granulate or light-curing liquid polymers (in particular bio-compatible photopolymers), wherein the shape configurations are formed on the lower face and the upper face by additive molding.

As already mentioned further above, in particular also a set of dental splints can be provided within the scope of the invention, wherein the splints of the set have different lateral and/or frontal/dorsal and/or vertical as well as rotational offset amounts as compared to the position relation of optimum occlusion. Herewith, this provides the patient with a universal therapy aid, wherefrom he can make a selection corresponding to his momentary condition and his momentary demand and can at the same time counteract "habituation effects" or increasing feelings of inconvenience or diminishing therapeutical action during a prolonged use of one and the same splint.

Incidentally, as to preferred realizations of the dental splint as one product or of a set of dental splints, reference is made further above to various characteristics of the method according to the invention.

Figure 1B:
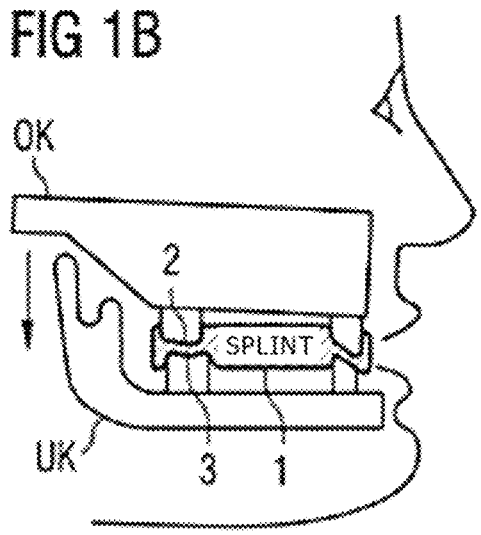
Figure 1C:
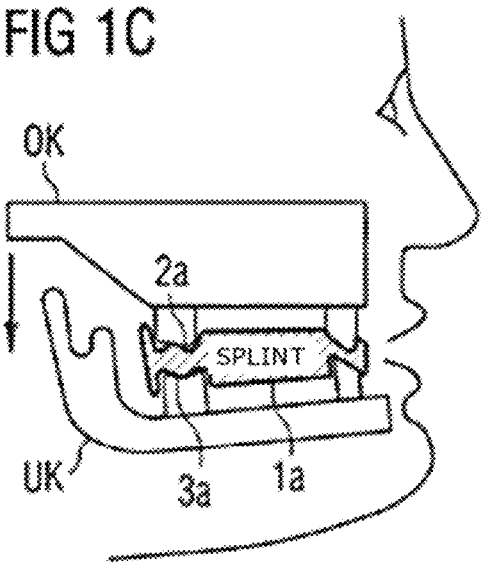
Figure 1D:
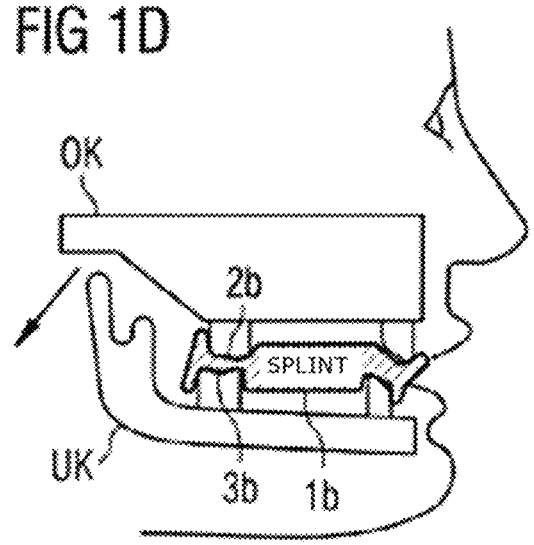
Figure 1E:
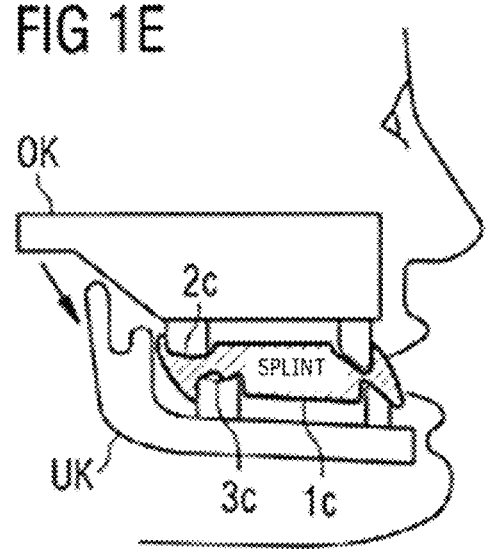
Figure 2:
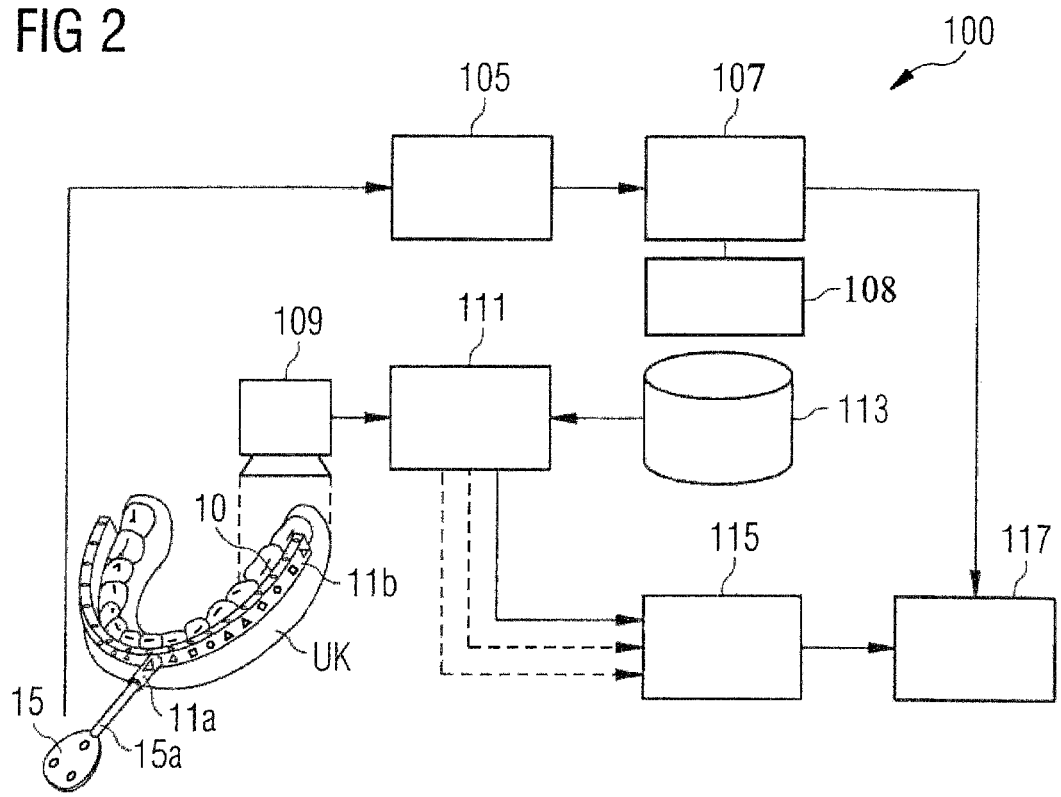
Figure 3:
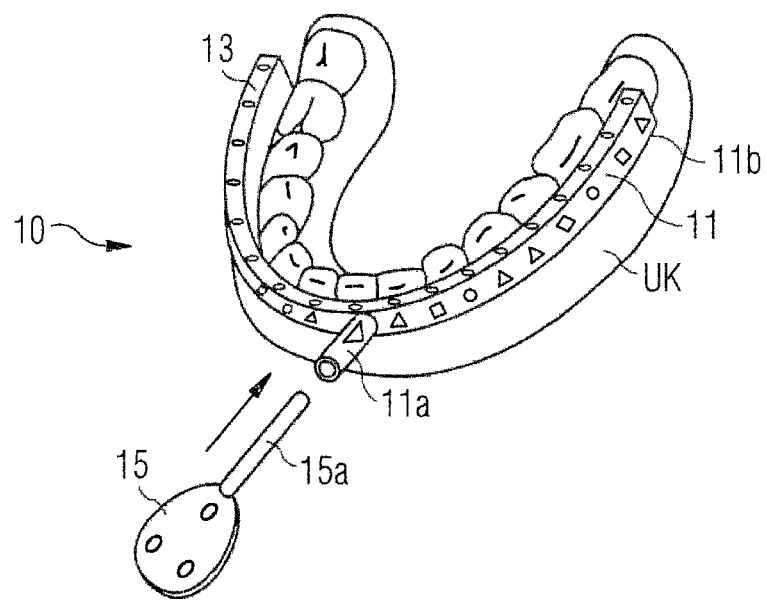

Advantages and expediencies of the invention incidentally will result from the following description of an exemplary embodiment with reference to the Figures. Shown are in:

FIGS. 1A-1E schematic representations of a patient's dentation in the state of optimum occlusion, without a dental splint (FIG. 1A), on the one hand, and having different dental splints manufactured according to the invention (FIGS. 1B-1E), on the other hand, FIG. 2 a principal sketch (functional block diagram) of a system for obtaining intraoral scans of the dental surfaces and associated position data, FIG. 3 a perspective representation of a para-occlusal bracket to be inserted in such a system, and FIGS. 4A to 4D sketch-like representations of steps for producing a dental splint according to the invention.

For explaining substantial aspects of a dental splint produced according to the invention, FIGS. 1A-1E represent schematic representations of the upper jaw OK and the lower jaw UK of a patient in whom a splint therapy with dental splints is implemented for treating functional disorders of the jaw joint.

In this case, FIG. 1A shows the state of optimum occlusion, consequently of the closing engagement of the dental surfaces SOK of the upper jaw and the dental surfaces SUK of the lower jaw. If, from a clinical point of view, this position is not advantageous, e.g. painful, the jaw joint is repositioned into a therapeutically desired position by means of a dental splint. Depending on the patient-specific functional disorder and in particular also depending on the pain feelings of the patient, a plurality of options regularly exists for this purpose, between which can also be "switched" during the therapeutic process in case of demand.

FIG. 1B, for example, shows the jaw position with an inserted dental splint 1, a so-called distraction splint, which slightly shifts the lower jaw (in parallel to the occlusion plane) downwards. Apart from the fact that the dental splint 1 of course also has a certain thickness, the position of a molding configuration 2 on the upper face corresponding to a large extent to the dental surface profile of the upper jaw OK, corresponds with respect to the molding configuration 3 on the lower face to the position relation of optimum occlusion.

FIG. 1C shows another dental splint 1a, which can be likewise referred to as a distraction splint, but which displaces the lower jaw in the rear area further downwards than the dental splint 1 of FIG. 1B. Consequently, here exists a vertical offset amount in the rear area of the splint 1a between the molding configuration 2a on the upper face and the molding configuration 3a on the lower face. Since the splint 1a basically causes the molding configuration to be tilted with respect to the position of optimum occlusion, there is also a (small) frontal-dorsal offset amount.

FIG. 1D schematically shows the jaw position with another inserted dental splint 1b, which can be referred to as a retrusion/distraction splint and slightly shifts the lower jaw downwards/rearwards. With respect to the position of optimum occlusion (FIG. 1A), there is both a vertical and a frontal-dorsal offset amount between the molding configuration 2b on the upper face and the molding configuration 3b on the lower face of the splint 1b.

FIG. 1E shows a dental splint 1c as a further variant, which can be referred to as a protrusion splint and slightly shifts the lower jaw forwards. Between the molding configuration 2c on the upper face and the molding configuration 3c on the lower face of the dental splint 1c, consequently there is a significant frontal-dorsal offset amount, but no substantial vertical offset amount.

Apart from the configurations shown here by way of example, there are numerous other configurations, and basically dental splints can also be therapeutically reasonable, in which between the shape configurations on the upper face and the lower face exclusively or in addition to a vertical or frontal-dorsal offset amount, a lateral (right-left) offset amount is present so that the lower jaw teeth are correspondingly laterally shifted with respect to the upper jaw teeth.

These therapeutical measures may in particular be combined with the measure to simultaneously correct orthodontic false positions of teeth and to exert a continuous pressure upon the teeth so as to thereby achieve an offset up to a desired tooth position.

The dental splints schematically shown in FIGS. 1B-1E may in each case be provided individually as therapy aids or a set of dental splints (and, if necessary, other and/or further ones) can be formed from them.

FIG. 2 shows as a principal sketch essential parts of a system 100 for the moving picture detection/representation of a patient's dentition while using a special para-occlusal bracket 10 as shown in FIG. 3 in a sketch-like manner.

The system comprises a position signal detection unit 105 and a position calculation unit 107, which evaluate the position signals from a position marker part 15 of the bracket 10 in its state inserted in the mouth of a patient. The result is a position data set of the bracket which exactly represents that position of the bracket with respect to a space-fixed coordinate system in which scans of the lower jaw and/or the upper jaw had been generated.

The dental surfaces are optically detected by means of an intraoral scanner 109 in a defined partial area of the total extension of the bracket by the detection zone 109a of the scanner, and the associated image data set is stored. It comprises image data of the markers (not shown completely in this Figure) at the edges of the coupling spoon, which are situated within the detection zone 109a. From a data base 11, an image data set previously generated and stored of the entire bracket is loaded into a comparing processing unit 113 and subjected to a comparing processing with the image data set of the detection zone 109a there. In this case, the markers situated within the detection zone are identified as a partial amount of all of the markers provided in the coupling spoon, and on the basis of this identification, the detection zone 109a and consequently the impressions 101a situated within it can be precisely allocated in position with respect to the bracket 10.

Together with the associated (relative) position coordinates, the image obtained in the detection zone 109a arrives in an overall picture synthesis stage 115, in which it is processed together with the images (partial images) obtained by the scanner in other partial areas—into a dental surface overall picture while taking the relative position coordinates as a basis.

Both the partial image provided with the relative position coordinates and the dental surface overall picture can be referred to a space-fixed coordinate system by means of the (absolute) position coordinates of the bite fork obtained within the position calculation unit 107. In the Figure, this is represented for the dental surface overall picture that is provided at the output of the overall picture synthesis stage 115. Together with the position coordinates available at the output of the position calculation unit 107 it is subjected to a combining processing in an image/coordinate allocation stage 117. The result is a dental surface overall picture absolutely true to coordinates which can be used in the method according to the invention (as a control data set) but also for visualizations of dental diagnostic findings or other measures.

FIG. 3 shows the para-occlusal bracket 10 set frontally upon the entire tooth row of a patient's lower jaw UK, which is fixed to the teeth by means of a preferably elastic or hard elastic, sufficiently adhesive registration material or adhesive 13. In a central position of the bracket basic body 11, a mounting sleeve 11a protruding frontwards at a right angle is arranged thereon, which is adaptable to a mounting pin 15a of the sensor part 15 to be attached to the bracket basic body 11. In this realization represented in a simplified manner, the attachment is performed by pushing the pin 15a into the sleeve 11a and by fixing the pin within the sleeve in a friction fit (or form-fit) manner. Appropriately, in practice, the pin-sleeve arrangement is provided with moldings for specifying a defined angular position of the sensor part 15 with respect to the bracket basic body 11 (such as a tongue and groove arrangement), which, however, is not shown in the Figure.

At the upper face and front face of the bracket basic body 11, various markers 11b are provided, which are easily readable for an intraoral scanner and are easily distinguishable in evaluating a scan. The markers, represented here as different symbols, but can also be formed to be colored or as elevations/depressions or the like, allow portions of the bracket basic body 11 taken in a scan and thus the respectively mapped teeth to be unequivocally allocated to a position with respect to the lower jaw.

The bracket basic body 11 is produced as a molded part, such as a plastic injection molded part (such as of polyamide or ABS or another physiologically harmless polymer) but also as a cast part of metal (e.g. from an aluminum alloy). It can be a plastic molded part with an inserted metal reinforcement or another kind of molded part. The molded part can be partially or in total consist of a transparent material allowing it to be received on dental surfaces simultaneously with the markings.

The measurement sensor part 15 is represented in FIG. 3 merely in a symbolic manner; it may include an arrangement (known per se) of transmitters or sensors or reflectors of an ultrasound position determination system.

As already noted further above, the system explained above may also be used to record moving picture records (or corresponding data sets of the dental surfaces of the lower jaw and upper jaw that are true to their coordinates) in case of the patient's different dentition movements and to obtain envelopes of the motion curves from this, that are finally used for producing the shape configurations on the upper face and lower face of the occlusion splint.

The consideration of predetermined offset amounts may comprise, as likewise already noted, a step of a feedback delivered by the patient with respect to pain-afflicted or pain-free relative positions, wherein here, in this case, exact position data or coordinate-precise image data sets can be allocated to the patient's feedback.

Figure 4:
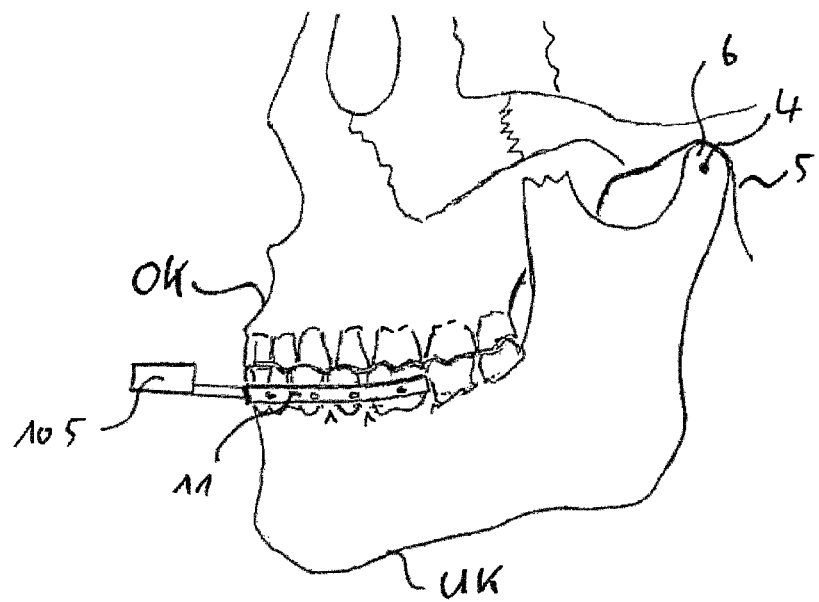
Figure 4:
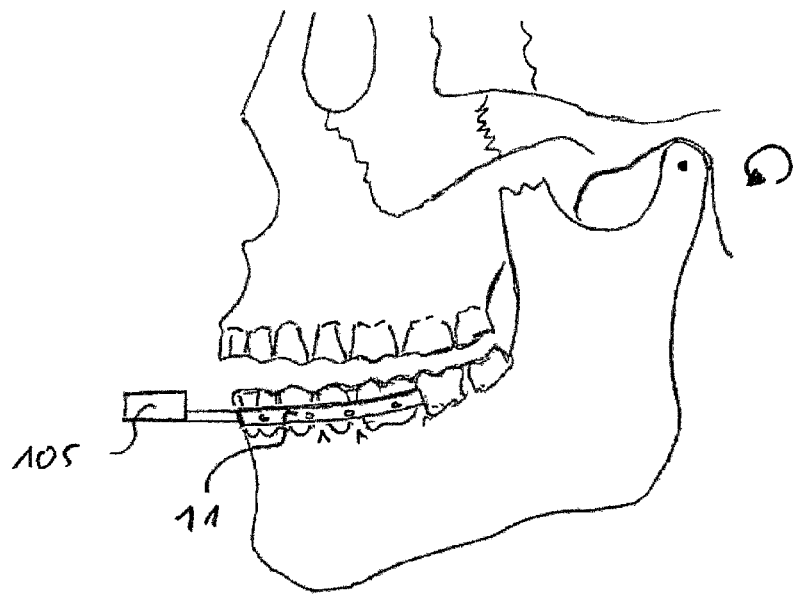
Figure 4C:
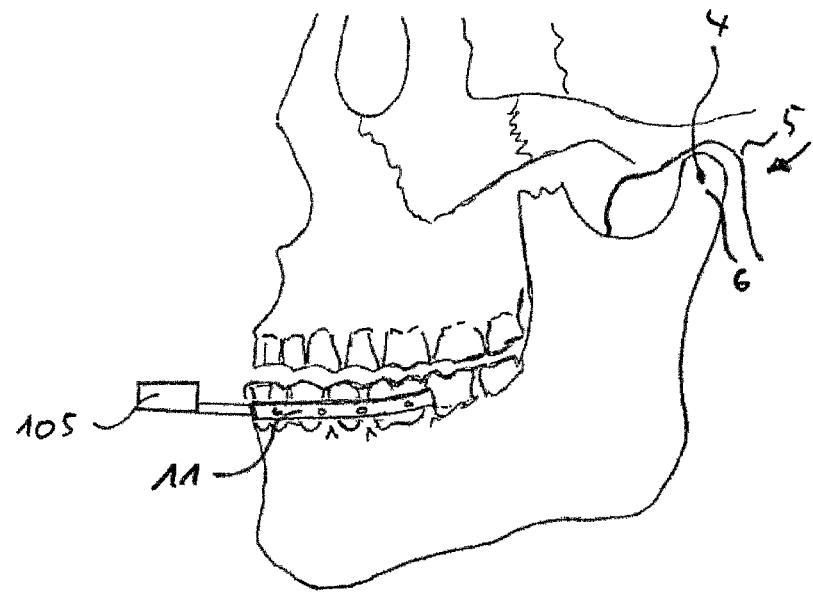

FIGS. 4A-4D show a greatly simplified representation of a human upper jaw and lower jaw including a jaw joint, wherein in FIGS. 4A to 4C three different lower jaw positions including a corresponding tooth situation and condyle position are represented.

The position signal detection unit 105 is in each case attached to the lower jaw teeth via a corresponding support 11. As described further above, the detection unit 105 can include optical, acoustical, magnetic or initial sensors and possibly still requires a stationary transmitting and receiving unit (not represented here) that is attached to the head or upper jaw.

FIG. 4A shows the teeth of the upper jaw and lower jaw in occlusion, wherein the condyle joint head 6 is located in the rear area of the joint recess (fossa mandibularis) 5. The center of the condyles 4 may be detected by the position measurement system, for example, via a rotational movement (as shown in FIG. 4B) and be used as the joint focus or joint center for the further calculations of the condyle positions.

The condyle positions represented in both of the FIGS. 4A and 4B may be quite undesired and also come about by abrasion of the teeth. As shown in FIG. 4B, a retention of the joint heads in the rear position may occur during an opening movement. In this position, a splint that is not effective to the patient would be possibly created. It is therefore preferred to carry out a feedback control of the condyle position in the construction of dental splints by means of the method according to the invention.

FIG. 4C shows a possibly desired condyle position as well as a tooth situation which would come about with a dental splint having a desired wall thickness, wherein the condyle center moves forwards by a translatory amount and a joint gap gas formed in the rear area. For determining a defined and optimum splint wall thickness, in this case as well, an acoustic, visual or haptic feedback method is proposed.

Figure 4D:
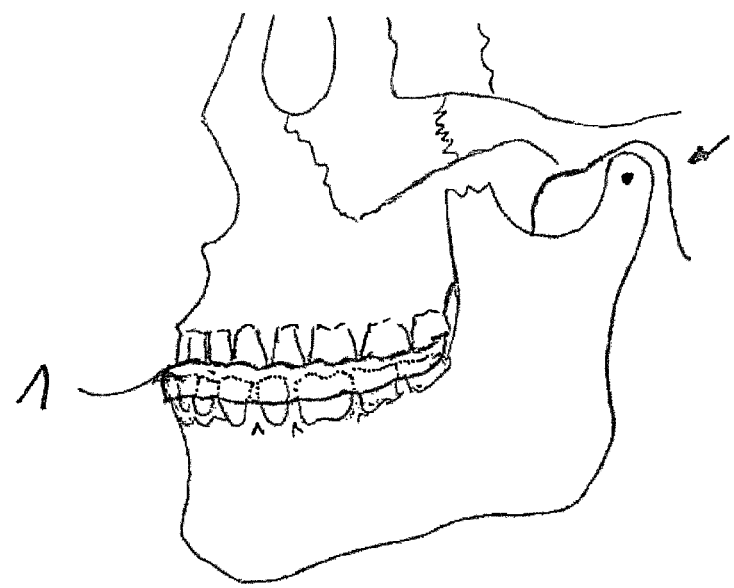

FIG. 4D shows a dental splint 1 manufactured based on the position data determined in this situation. Here, it is proposed in particular, not to generate only one dental splint (as represented), but a set of splints having different splint wall thicknesses.

The implementation of the invention is not restricted to the aspects and explained examples emphasized above, but is likewise possible in a great number of modifications which are in the scope of expertise action.

The invention claimed is:

1. A method for producing a dental splint for a patient for a treatment of craniomandibular dysfunction or for a correction of tooth misalignment, which comprises the steps of:
   forming the dental splint with a body made of plastics, composite or elastomer;
   configuring a lower face of the body of the dental splint with a shape according to at least portions of a dental surface profile of a lower jaw of the patient to define a lower face shape configuration thereon;
   configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;
   scanning dental surfaces of the lower jaw and the upper jaw of the patient in a position of optimum occlusion to provide a set of optimum occlusion scans having data sets associated therewith;
   determining an occlusion position relation between the lower jaw and the upper jaw of the patient using a position determination system, and thus an occlusion relation between the data sets of the optimum occlusion scans;
   scanning dental surfaces of the lower jaw and the upper jaw of the patient in a position different from the optimum occlusion to provide a set of non-occlusion scans having data sets associated therewith;
   determining a non-occlusion position relation between the lower jaw and the upper jaw of the patient which is different from the occlusion position using the position determination system, and thus a non-occlusion relation between the data sets of the non-occlusion scans;
   determining, from the data sets of the occlusion relation and the non-occlusion relation, a lateral or frontal-dorsal or vertical offset amount from at least portions of the occlusion and non-occlusion scans;
   modifying the lower face shape configuration of the lower face of the body of the dental splint or the upper face shape configuration of the upper face of the body of the dental splint using a coordinate-controlled, abrasive processing method, while taking into account the determined lateral or frontal-dorsal or vertical offset amount;
   wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;
   evaluating the associated condyle relative positions according to a predetermined evaluation algorithm; and
   wherein the determination of the lateral or frontal-dorsal or vertical offset amount is performed when the positions of the condyles or condyle centers have been changed with respect to an initial relative position by a defined translatory amount.

2. A dental splint produced by a method according to claim 1.

3. The dental splint according to claim 2, formed as a lower jaw splint for being fixed onto the patients' lower jaw, wherein the shape configuration on the lower face substantially is contoured according to the total dental surface profile of the patients' lower jaw.

4. The dental splint according to claim 2, formed as an upper jaw splint for being fixed onto the patients' upper jaw, wherein the shape configuration on the lower face substantially is contoured according to the total dental surface profile of the patients' upper jaw.

5. The dental splint according to claim 2, substantially formed from rigid plastic with a shape configuration milled into the lower face and the upper face.

6. The dental splint according to claim 2, manufactured from a fused thermoplastic powder or granulate or light-curing liquid polymers, wherein the shape configurations on the lower face or the upper face are formed by additive molding.

7. The dental splint according to claim 2, manufactured from a thermoplastic film, wherein the shape configurations on the lower face or the upper face are formed by a pressure/heat shaping process and/or by means of an adaptation element placed upon and manufactured by a milling process or additive molding onto at least one of the lower face and the upper face.

8. A set of dental splints, each dental splint being produced by a method according to claim 1, wherein the dental splints of the set have different lateral or frontal-dorsal or vertical offset amounts with respect to the position relation of optimum occlusion or have a different thickness at least in portions.

9. A method for producing a dental splint for a patient for a treatment of craniomandibular dysfunction or for a correction of tooth misalignment, which comprises the steps of:
    forming the dental splint with a body made of plastics, composite or elastomer;
    configuring a lower face of the body of the dental splint with a shape according to at least portions of a dental surface profile of a lower jaw of the patient to define a lower face shape configuration thereon;
    configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;
    directly scanning intraorally dental surfaces of the lower jaw and the upper jaw of the patient in a position of optimum occlusion to provide a set of optimum occlusion scans having data sets associated therewith;
    determining an occlusion position relation between the lower jaw and the upper jaw of the patient using a position determination system, and thus an occlusion relation between the data sets of the optimum occlusion scans;
    directly scanning intraorally dental surfaces of the lower jaw and the upper jaw of the patient in a position different from the optimum occlusion to provide a set of non-occlusion scans having data sets associated therewith;
    determining a non-occlusion position relation between the lower jaw and the upper jaw of the patient which is different from the occlusion position using the position determination system, and thus a non-occlusion relation between the data sets of the non-occlusion scans;
    determining, from the data sets of the occlusion relation and the non-occlusion relation, a lateral or frontal-dorsal or vertical offset amount from at least portions of the occlusion and non-occlusion scans;
    modifying on the basis of the occlusion scans and the non-occlusion scans the lower face shape configuration of the lower face of the body of the dental splint and the upper face shape configuration of the upper face of the body of the dental splint using an additive production method, while taking into account the determined lateral or frontal-dorsal or vertical offset amount;
    wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;
    evaluating the associated condyle relative positions according to a predetermined evaluation algorithm; and
    wherein the determination of the lateral or frontal-dorsal or vertical offset amount is performed when the positions of the condyles or condyle centers have been changed with respect to an initial relative position by a defined translatory amount.

10. A method for producing a dental splint for a patient for a treatment of craniomandibular dysfunction or for a correction of tooth misalignment, which comprises the steps of:
    forming the dental splint with a body made of plastics, composite or elastomer;
    configuring a lower face of the body of the dental splint with a shape according to at least portions of a dental surface profile of a lower jaw of the patient to define a lower face shape configuration thereon;
    configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;
    scanning dental surfaces of the lower jaw and the upper jaw of the patient in a position of optimum occlusion to provide a set of optimum occlusion scans having data sets associated therewith;
    determining an occlusion position relation between the lower jaw and the upper jaw of the patient using a position determination system, and thus an occlusion relation between the data sets of the optimum occlusion scans;
    scanning dental surfaces of the lower jaw and the upper jaw of the patient in a position different from the optimum occlusion to provide a set of non-occlusion scans having data sets associated therewith;
    determining a non-occlusion position relation between the lower jaw and the upper jaw of the patient which is different from the occlusion position using the position determination system, and thus a non-occlusion relation between the data sets of the non-occlusion scans;
    determining, from the data sets of the occlusion relation and the non-occlusion relation, a lateral or frontal-dorsal or vertical offset amount from at least portions of the occlusion and non-occlusion scans;
    modifying the lower face shape configuration of the lower face of the body of the dental splint or the upper face shape configuration of the upper face of the body of the dental splint using a coordinate-controlled, abrasive processing method, while taking into account the determined lateral or frontal-dorsal or vertical offset amount;
    wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;
    evaluating the associated condyle relative positions according to a predetermined evaluation algorithm; and
    emitting an acoustic, visual or haptic signal by the position determination system when, during a movement of the lower jaw of the patient, a position of the condyle is in or outside of a defined area or moves toward or away from the defined area or a thickness of the body of the dental splint has reached a predefined amount.

11. A method for producing a dental splint for a patient for a treatment of craniomandibular dysfunction or for a correction of tooth misalignment, which comprises the steps of:
   forming the dental splint with a body made of plastics, composite or elastomer;
   configuring a lower face of the body of the dental splint with a shape according to at least portions of a dental surface profile of a lower jaw of the patient to define a lower face shape configuration thereon;
   configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;
   directly scanning intraorally dental surfaces of the lower jaw and the upper jaw of the patient in a position of optimum occlusion to provide a set of optimum occlusion scans having data sets associated therewith;
   determining an occlusion position relation between the lower jaw and the upper jaw of the patient using a position determination system, and thus an occlusion relation between the data sets of the optimum occlusion scans;
   directly scanning intraorally dental surfaces of the lower jaw and the upper jaw of the patient in a position different from the optimum occlusion to provide a set of non-occlusion scans having data sets associated therewith;
   determining a non-occlusion position relation between the lower jaw and the upper jaw of the patient which is different from the occlusion position using the position determination system, and thus a non-occlusion relation between the data sets of the non-occlusion scans;
   determining, from the data sets of the occlusion relation and the non-occlusion relation, a lateral or frontal-dorsal or vertical offset amount from at least portions of the occlusion and non-occlusion scans;
   modifying on the basis of the occlusion scans and the non-occlusion scans the lower face shape configuration of the lower face of the body of the dental splint and the upper face shape configuration of the upper face of the body of the dental splint using an additive production method, while taking into account the determined lateral or frontal-dorsal or vertical offset amount;
   wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;
   evaluating the associated condyle relative positions according to a predetermined evaluation algorithm; and
   emitting an acoustic, visual or haptic signal by the position determination system when, during a movement of the lower jaw of the patient, a position of the condyle is in or outside of a defined area or moves toward or away from the defined area or a thickness of the body of the dental splint has reached a predefined amount.

12. A method for producing a dental splint for a patient for a treatment of craniomandibular dysfunction or for a correction of tooth misalignment, which comprises the steps of:
   forming the dental splint with a body made of plastics, composite or elastomer;
   configuring a lower face of the body of the dental splint with a shape according to at least portions of a dental surface profile of a lower jaw of the patient to define a lower face shape configuration thereon;
   configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;
   scanning dental surfaces of the lower jaw and the upper jaw of the patient in a position of optimum occlusion to provide a set of optimum occlusion scans having data sets associated therewith;
   determining an occlusion position relation between the lower jaw and the upper jaw of the patient using a position determination system, and thus an occlusion relation between the data sets of the optimum occlusion scans;
   scanning dental surfaces of the lower jaw and the upper jaw of the patient in a position different from the optimum occlusion to provide a set of non-occlusion scans having data sets associated therewith;
   determining a non-occlusion position relation between the lower jaw and the upper jaw of the patient which is different from the occlusion position using the position determination system, and thus a non-occlusion relation between the data sets of the non-occlusion scans;
   determining, from the data sets of the occlusion relation and the non-occlusion relation, a lateral or frontal-dorsal or vertical offset amount from at least portions of the occlusion and non-occlusion scans;
   modifying the lower face shape configuration of the lower face of the body of the dental splint or the upper face shape configuration of the upper face of the body of the dental splint using a coordinate-controlled, abrasive processing method, while taking into account the determined lateral or frontal-dorsal or vertical offset amount;
   wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;
   evaluating the associated condyle relative positions according to a predetermined evaluation algorithm; and
   wherein, for determining the occlusion relation of optimum occlusion or the non-occlusion relation, causing the patient to perform a sequence of predetermined jaw movements, including the patient performing opening movements of the patient's lower jaw, and registering each lower jaw movement, and interlinking the taken scans of the dental surfaces with detected position data for deriving respective envelopes of positions of the dental surfaces of the patient's lower jaw and the patient's upper jaw.

13. A method for producing a dental splint for a patient for a treatment of craniomandibular dysfunction or for a correction of tooth misalignment, which comprises the steps of:
   forming the dental splint with a body made of plastics, composite or elastomer;

configuring a lower face of the body of the dental splint with a shape according to at least portions of a dental surface profile of a lower jaw of the patient to define a lower face shape configuration thereon;

configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;

directly scanning intraorally dental surfaces of the lower jaw and the upper jaw of the patient in a position of optimum occlusion to provide a set of optimum occlusion scans having data sets associated therewith;

determining an occlusion position relation between the lower jaw and the upper jaw of the patient using a position determination system, and thus an occlusion relation between the data sets of the optimum occlusion scans;

directly scanning intraorally dental surfaces of the lower jaw and the upper jaw of the patient in a position different from the optimum occlusion to provide a set of non-occlusion scans having data sets associated therewith;

determining a non-occlusion position relation between the lower jaw and the upper jaw of the patient which is different from the occlusion position using the position determination system, and thus a non-occlusion relation between the data sets of the non-occlusion scans;

determining, from the data sets of the occlusion relation and the non-occlusion relation, a lateral or frontal-dorsal or vertical offset amount from at least portions of the occlusion and non-occlusion scans;

modifying on the basis of the occlusion scans and the non-occlusion scans the lower face shape configuration of the lower face of the body of the dental splint and the upper face shape configuration of the upper face of the body of the dental splint using an additive production method, while taking into account the determined lateral or frontal-dorsal or vertical offset amount;

wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;

evaluating the associated condyle relative positions according to a predetermined evaluation algorithm; and wherein, for determining the occlusion relation of optimum occlusion or the non-occlusion relation, causing the patient to perform a sequence of predetermined jaw movements, including the patient performing opening movements of the patient's lower jaw, and registering each lower jaw movement, and interlinking the taken scans of the dental surfaces with detected position data for deriving respective envelopes of positions of the dental surfaces of the patient's lower jaw and the patient's upper jaw.

14. A method for producing a dental splint for a patient for a treatment of craniomandibular dysfunction or for a correction of tooth misalignment, which comprises the steps of:

forming the dental splint with a body made of plastics, composite or elastomer;

configuring a lower face of the body of the dental splint with a shape according to at least portions of a dental surface profile of a lower jaw of the patient to define a lower face shape configuration thereon;

configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;

scanning dental surfaces of the lower jaw and the upper jaw of the patient in a position of optimum occlusion to provide a set of optimum occlusion scans having data sets associated therewith;

determining an occlusion position relation between the lower jaw and the upper jaw of the patient using a position determination system, and thus an occlusion relation between the data sets of the optimum occlusion scans;

scanning dental surfaces of the lower jaw and the upper jaw of the patient in a position different from the optimum occlusion to provide a set of non-occlusion scans having data sets associated therewith;

determining a non-occlusion position relation between the lower jaw and the upper jaw of the patient which is different from the occlusion position using the position determination system, and thus a non-occlusion relation between the data sets of the non-occlusion scans;

determining, from the data sets of the occlusion relation and the non-occlusion relation, a lateral or frontal-dorsal or vertical offset amount from at least portions of the occlusion and non-occlusion scans;

imprinting, using a pressure/heat shaping process, at least portions of the taken scans onto a thermoplastic film disposed on the lower face or the upper face of the body of the dental splint as respective upper face and lower face shape configurations, while taking into account the determined lateral or frontal-dorsal or vertical offset amount;

wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;

evaluating the associated condyle relative positions according to a predetermined evaluation algorithm; and wherein the determination of the lateral or frontal-dorsal or vertical offset amount is performed when the positions of the condyles or condyle centers have been changed with respect to an initial relative position by a defined translatory amount.

15. A method for producing a dental splint for a patient for a treatment of craniomandibular dysfunction or for a correction of tooth misalignment, which comprises the steps of:

forming the dental splint with a body made of plastics, composite or elastomer;

configuring a lower face of the body of the dental splint with a shape according to at least portions of a dental surface profile of a lower jaw of the patient to define a lower face shape configuration thereon;

configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;

scanning dental surfaces of the lower jaw and the upper jaw of the patient in a position of optimum occlusion to provide a set of optimum occlusion scans having data sets associated therewith;

determining an occlusion position relation between the lower jaw and the upper jaw of the patient using a position determination system, and thus an occlusion relation between the data sets of the optimum occlusion scans;

scanning dental surfaces of the lower jaw and the upper jaw of the patient in a position different from the optimum occlusion to provide a set of non-occlusion scans having data sets associated therewith;

determining a non-occlusion position relation between the lower jaw and the upper jaw of the patient which is different from the occlusion position using the position determination system, and thus a non-occlusion relation between the data sets of the non-occlusion scans;

determining, from the data sets of the occlusion relation and the non-occlusion relation, a lateral or frontal-dorsal or vertical offset amount from at least portions of the occlusion and non-occlusion scans;

imprinting, using a pressure/heat shaping process, at least portions of the taken scans onto a thermoplastic film disposed on the lower face or the upper face of the body of the dental splint as respective upper face and lower face shape configurations, while taking into account the determined lateral or frontal-dorsal or vertical offset amount;

wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;

evaluating the associated condyle relative positions according to a predetermined evaluation algorithm; and emitting an acoustic, visual or haptic signal by the position determination system when, during a movement of the lower jaw of the patient, a position of the condyle is in or outside of a defined area or moves toward or away from the defined area or a thickness of the body of the dental splint has reached a predefined amount.

16. A method for producing a dental splint for a patient for a treatment of craniomandibular dysfunction or for a correction of tooth misalignment, which comprises the steps of:

forming the dental splint with a body made of plastics, composite or elastomer;

configuring a lower face of the body of the dental splint with a shape according to at least portions of a dental surface profile of a lower jaw of the patient to define a lower face shape configuration thereon;

configuring an upper face of the body of the dental splint with a shape according to at least portions of a dental surface profile of an upper jaw of the patient to define an upper face shape configuration thereon, the upper face shape configuration having a defined lateral or frontal-dorsal or vertical offset amount on the upper face of the body of the dental splint relative to a position relation of optimum occlusion with respect to the lower face shape configuration on the lower face;

scanning dental surfaces of the lower jaw and the upper jaw of the patient in a position of optimum occlusion to provide a set of optimum occlusion scans having data sets associated therewith;

determining an occlusion position relation between the lower jaw and the upper jaw of the patient using a position determination system, and thus an occlusion relation between the data sets of the optimum occlusion scans;

scanning dental surfaces of the lower jaw and the upper jaw of the patient in a position different from the optimum occlusion to provide a set of non-occlusion scans having data sets associated therewith;

determining a non-occlusion position relation between the lower jaw and the upper jaw of the patient which is different from the occlusion position using the position determination system, and thus a non-occlusion relation between the data sets of the non-occlusion scans;

determining, from the data sets of the occlusion relation and the non-occlusion relation, a lateral or frontal-dorsal or vertical offset amount from at least portions of the occlusion and non-occlusion scans;

imprinting, using a pressure/heat shaping process, at least portions of the taken scans onto a thermoplastic film disposed on the lower face or the upper face of the body of the dental splint as respective upper face and lower face shape configurations, while taking into account the determined lateral or frontal-dorsal or vertical offset amount;

wherein, for determining the lateral or frontal-dorsal or vertical offset amount, causing the patient to perform a series of predetermined jaw movements, including the patient performing opening and forward feed movements of the patient's lower jaw, and for each lower jaw movement, registering an associated condyle relative position and feedback from the patient;

evaluating the associated condyle relative positions according to a predetermined evaluation algorithm; and wherein, for determining the occlusion relation of optimum occlusion or the non-occlusion relation, causing the patient to perform a sequence of predetermined jaw movements, including the patient performing opening movements of the patient's lower jaw, and registering each lower jaw movement, and interlinking the taken scans of the dental surfaces with detected position data for deriving respective envelopes of positions of the dental surfaces of the patient's lower jaw and the patient's upper jaw.

* * * * *